June 10, 1924.
W. DREDGE
BAKER'S OVEN
Filed Jan. 27, 1920     3 Sheets-Sheet 3
1,496,844
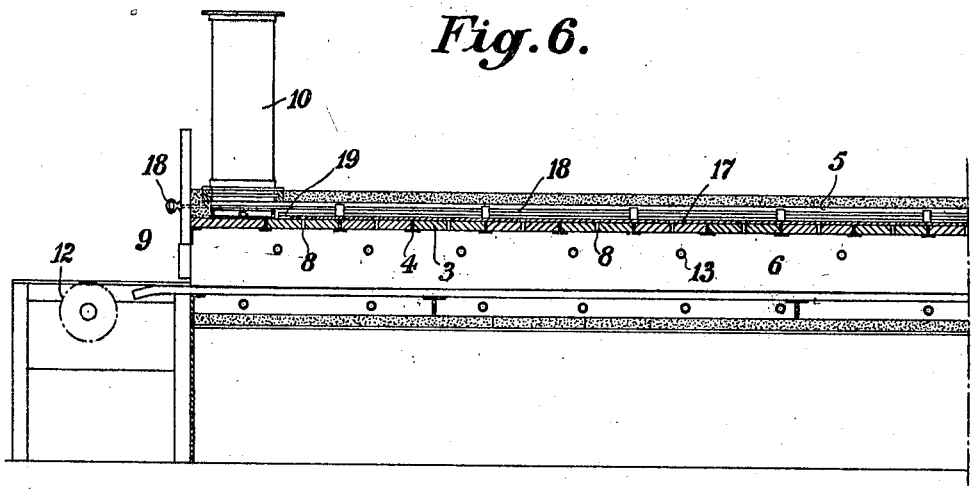
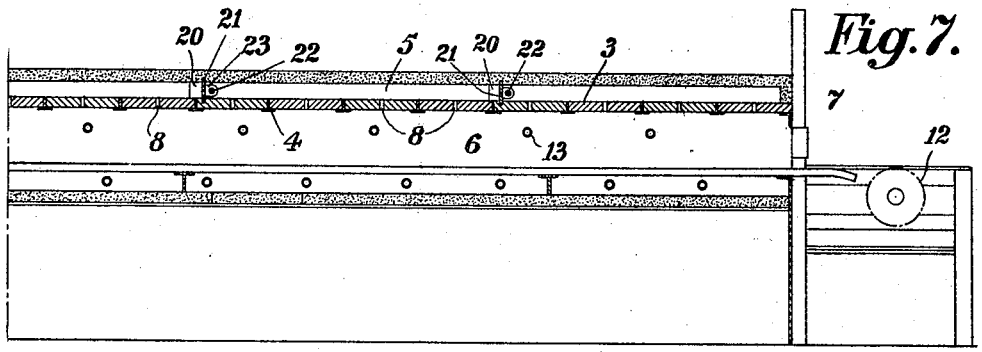
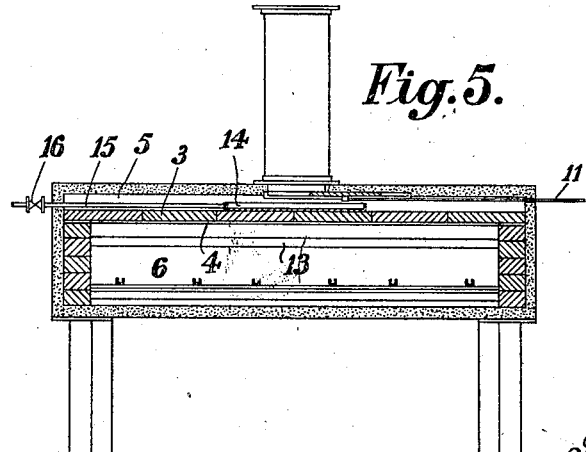
Inventor:
William Dredge,
By Dodge and Sons,
Associate Attorneys.

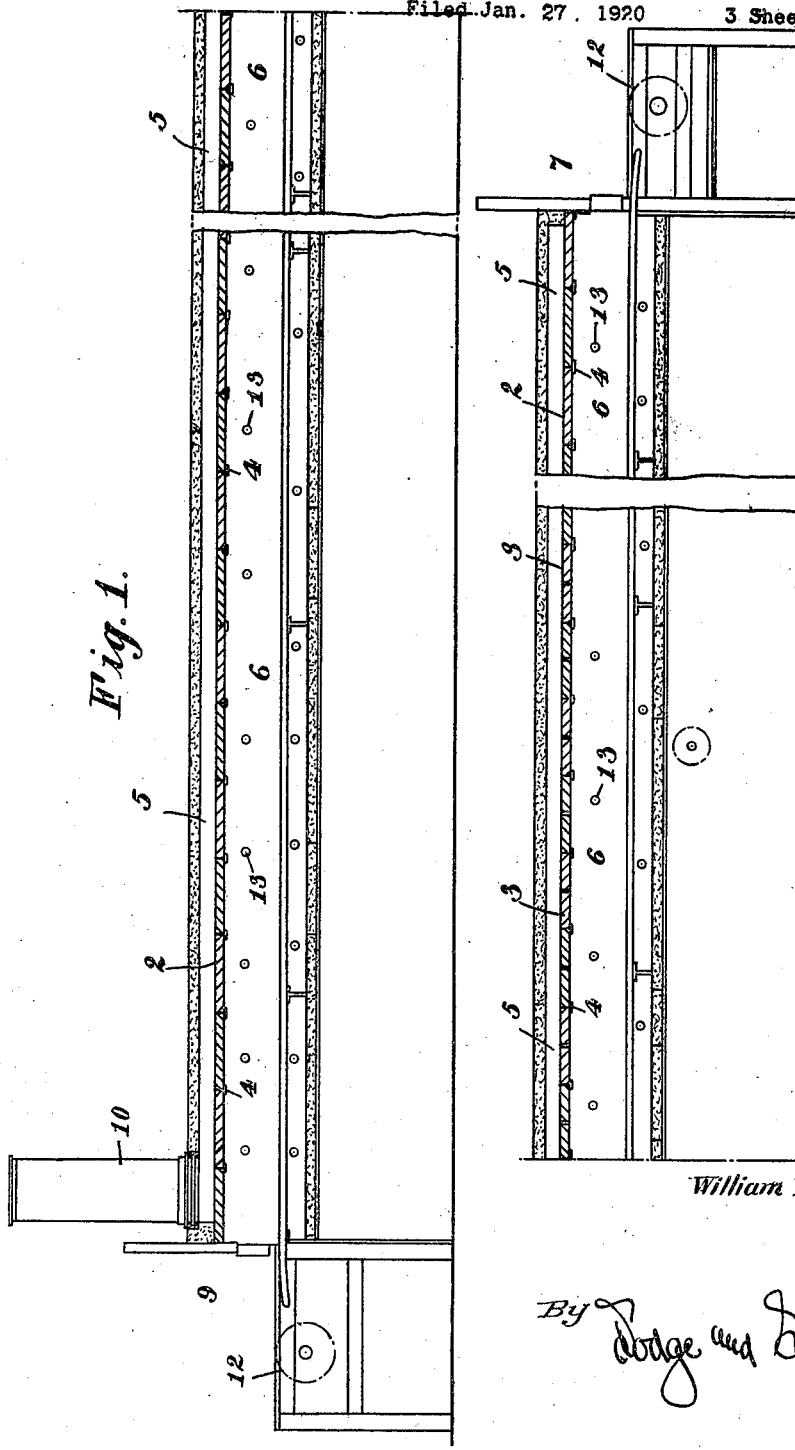

Patented June 10, 1924.

1,496,844

UNITED STATES PATENT OFFICE.

WILLIAM DREDGE, OF MANCHESTER, ENGLAND.

BAKER'S OVEN.

Application filed January 27, 1920. Serial No. 354,363.

*To all whom it may concern:*

Be it known that I, WILLIAM DREDGE, a subject of the King of Great Britain, residing at Manchester, in the county of Lancaster and Kingdom of England, have invented certain new and useful Improvements in or Relating to Bakers' Ovens, of which the following is a specification.

This invention relates to bakers' ovens, and has reference to the type wherein the baking chamber is heated internally, that is to say one in which the heat may be generated in, or passed through the baking chamber, as distinguished from the type in which the chamber is heated externally by flues surrounding it, so that the goods are baked by radiation of the heat from the external flues.

As a practical baker of many years experience, I have found in ovens of the internal gas heated type, that the oven chamber is liable to become flooded both with an excess of steam or other vapours arising from the goods being baked, and with the gases evolved by the burning of gaseous fuel. These superfluous vapours and combustion products accumulating within the oven chamber have hitherto been released by but one or two outlets which concentrated or focussed the liberation of such vapours and products at one or two particular points.

Following minutely the process of baking in the pursuit of my trade, I have observed and later convinced myself through practical tests, that certain classes of goods such as bread are improved by the presence of an atmosphere containing steam, while other kinds of goods such as biscuits require a dryer atmosphere and that the presence of an excess of steam at any rate at certain stages of the baking, is a disadvantage, also that the drawing off of the vapours and combustion products in a body through a multitude of small perforations partaking of the character of a strainer, instead of concentrating or focussing the liberation through a large opening at one given point or points, results in imparting to the goods an improved appearance, and produces a more efficient baking condition.

Accordingly the present invention is characterized by the feature that in a bakers' oven of the type referred to where the baking chamber is heated internally, a flue or collecting chamber controlled by a damper is provided which extends longitudinally of the roof or side walls or floor thereof, and in that the interior of the oven chamber communicates with this flue or collecting chamber by means of a multitude of perforations extending throughout the whole length of the oven chamber, or a part of the length thereof, so that the vapours or combustion products are drawn off in a body over a large area of the oven, instead of such withdrawal being concentrated or focussed at one particular point or points. Furthermore the provision of a multitude of these perforations extending throughout the whole length of the oven chamber, or at the end of the oven remote from the feeding end, or at the middle portion, and the provision of means for regulating the outflow of the superfluous vapours and combustion products, through these perforations, enables such superfluous vapours and combustion products to be removed at once as they are created or removed gradually, or retained, or retained at the initial stage of the baking but removed at the final stage or vice versa so that the oven is rendered applicable for baking different kinds of goods such as bread, biscuits and the like, and imparts to them an improved appearance which is such a desideratum of well prepared bakers' wares. In the case of biscuit baking ovens, I have found that the presence of an excess of steam at the initial stage of the baking is invaluable, provided there be an adequate heating temperature, while at the intermediate or later stages the presence of an excess of steam is injurious, and accordingly in biscuit ovens, the perforations according to my invention extend preferably from about the centre of the oven chamber part way or the whole way towards the delivery end, while the chamber from the feed end to about the centre is left imperforate.

The invention will be understood from the following description, reference being had to the accompanying drawing of a biscuit baking oven of the type referred to comprising a casing composed of non-conducting walls, the heating being effected by the combustion of a mixture of gas and air fed to the oven chamber by burner tubes preferably disposed transversely across the chamber, any suitable form of burner being used. In these:—

Figure 1 is a sectional elevation of about one half the length of a baker's oven.

Figure 2 is a similar view of the remainder thereof.

Fig. 5 is a cross-section through the oven, showing the arrangement for draining off condensed steam below the uptake;

Fig. 6 is a sectional elevation of the feeding end of the oven, embodying a modification in which a damper is provided to control the perforations at the feed end of the oven;

Fig. 7 is a sectional elevation of another modification.

Figure 3:
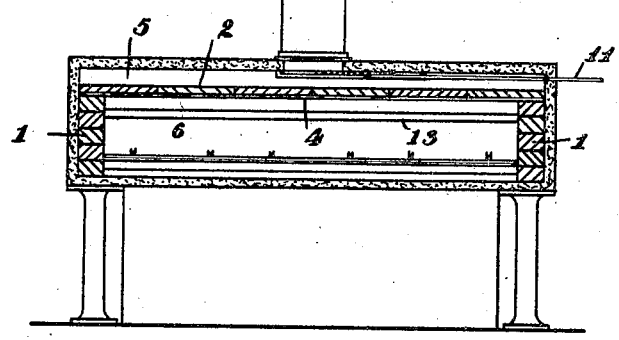
Figure 3 is a cross section through the oven.
Figure 4:
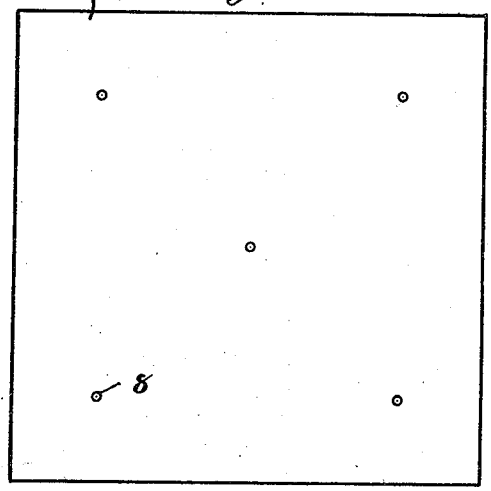
Figure 4 is a plan view of one of the perforated tiles on a larger scale than the preceding figures.

Referring to these figures, I construct the oven with fire brick walls 1, while the roof is built of tiles 2, 3 supported by metallic members 4 T-shape in cross section supported at the ends by the fire brick walls 1. Above these tiles is the flue or collecting chamber 5 extending longitudinally the whole length of the baking chamber or substantially so, and from about the centre of the oven chamber 6 part way towards the delivery end 7 the roof tiles 3 are perforated with holes 8 say five holes 8 in each tile these perforations forming the only communication between the oven chamber 6 and the collecting chamber 5, or the same result can be obtained by narrow openings between the tiles while from the feed end 9 of the oven to the centre thereof, and from the termination of the perforated tiles 3, the tiles 2 are left unperforated if required. Thus a multitude of perforations is provided leading from the oven chamber to the collecting chamber 5 for part of the oven chamber's length, through which the hot vapours and combustion products can be removed in a body, instead of the liberation being concentrated or focussed at one or two given points. The collecting chamber 5 communicates with the uptake 10 and immediately at the foot of the uptake I place a dripper if necessary, this dripper or tray 14 being made secure against leakage into the oven chamber and provided with a drain off pipe 15 and valve 16 to discharge condensed steam when required. The reason why I prefer the roof tiles 2 to be left unperforated from the feed end to about the centre is this, that for the purpose of baking biscuits the oven should be arranged to radiate the most intense heat at the start, and any considerable removal of the hot vapor and combustion products at this stage might be detrimental to uniformity in the baking of the biscuits. The presence of steam at the initial stage in the baking process is in my opinion invaluable, provided there be an adequate heating temperature, and accordingly the steam at that end of the baking chamber is maintained as far as possible, but at the intermediate or later stages in the baking the presence of an excess of steam is injurious, and accordingly it is removed by the multitude of perforations 8 and collecting chamber 5 hereinbefore referred to. The draught of the uptake 10 will draw the steam and combustion products through these perforated tiles 3 into the collecting chamber 5 and the steam and combustion products passing above the unperforated tiles 2 that is over the inner lining of the oven will transfer its heat thereto, and form in fact a heating jacket to the oven chamber.

At the juncture of the collecting chamber 5 and the uptake 10 I provide a damper 11 and by regulating this damper, the flow of steam or hot vapour and products of combustion through the perforations 8 into the collecting chamber 5 can be controlled so that they can be removed at once as they are created, or removed gradually, or retained according to the class of goods to be baked. Extending through the oven are pairs of endless travelling chains adapted to support trays or receptacles to receive the goods to be baked, these chains passing round end pulleys 12. The transversely disposed burner tubes are indicated at 13.

If, as in the modification shown in Fig. 6, the roof tiles are perforated throughout the length of the oven chamber, then in that case the perforations from the feed end to about the center of the oven are controlled by a sliding damper 17, operated by a rod 18 and sliding in guides 19. By means of this damper the said perforations can be closed when it is desired to retain the steam at one end of the oven, but to freely remove it at the other end thereof, the damper 11 in the uptake being relied on to regulate the amount of steam which is withdrawn according to the adjustment of the damper.

Or, as an alternative as shown in Fig. 7, the collecting chamber 5 may have partitions 20 at intervals, so as to divide it up into compartments, each partition being provided with a damper 21 operated by a rod 22 fixed to lugs 23. By operating these dampers, any number of the compartments may be closed to prevent the removal of the hot vapor wherever desired.

I declare that what I claim is:—

1. A baker's oven of the type wherein travelling means are provided for carrying the goods from the feed end of the oven to the discharge end thereof and the heating means are located interiorly of the oven chamber, comprising in combination, a casing having a horizontal partition therein dividing said casing into a lower oven chamber and a flue chamber extending longitudinally of said oven chamber, the partition between said chambers being provided over its entire surface with a multitude of openings therethrough, whereby the hot vapors and combustion products in the oven chamber may be drawn off in a body over a large area into said flue chamber; and means for regulating the outflow of the vapors and gases through said openings.

2. A baker's oven of the type wherein travelling means are provided for carrying the goods from the feed end of the oven to the discharge end thereof and the heating means are located interiorly of the oven chamber, comprising in combination, a casing having a horizontal partition therein dividing said casing into a lower oven chamber and an upper flue chamber extending longitudinally of said oven chamber; an uptake at the feed end of the oven structure with which said flue chamber communicates, said partition having a multitude of openings therethrough to permit the hot gases in the oven chamber to pass through said openings into the flue chamber and in contact with the entire upper side of said horizontal partition, between the points of entry of the gases into said chamber and the feed end of the oven, before entering the uptake.

3. A baker's oven of the type wherein travelling means are provided for carrying the goods from the feed end of the oven to the discharge end thereof and the heating means are located interiorly of the oven chamber, comprising in combination, a casing having a horizontal partition therein dividing said casing into a lower oven chamber and a flue chamber extending longitudinally of said oven chamber, the partition between said chambers being provided over its entire surface with a multitude of openings therethrough, whereby the hot vapors and combustion products in the oven chamber may be drawn off in a body over a large area into said flue chamber; and means for closing certain, or all, of said openings, as desired.

In witness whereof, I have hereunto signed my name this 7th day of January, 1920, in the presence of two subscribing witnesses.

WILLIAM DREDGE.

Witnesses:
Eswold S. Moseley,
George Weaver.